L. H. BRACE.
DRIVEN MOLD FOR SUNKEN CONCRETE STRUCTURES.
APPLICATION FILED AUG. 3, 1908.

903,441.

Patented Nov. 10, 1908.
5 SHEETS—SHEET 1

Witnesses:
John Enders
Chas. H. Buell

Inventor.
Linus H. Brace,
By Dyrenforth, Dyrenforth, Chritton & Wiles
Attys.

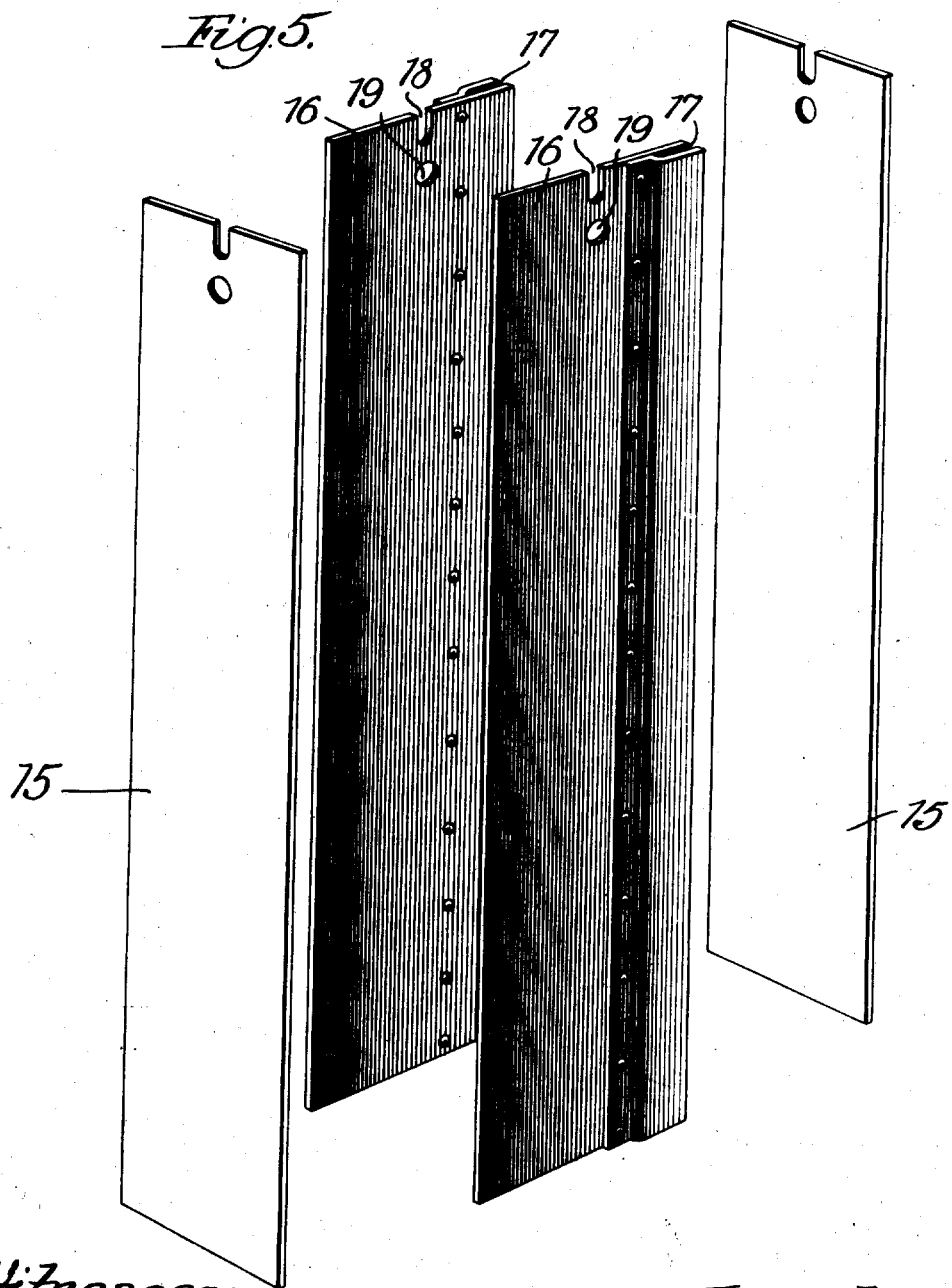

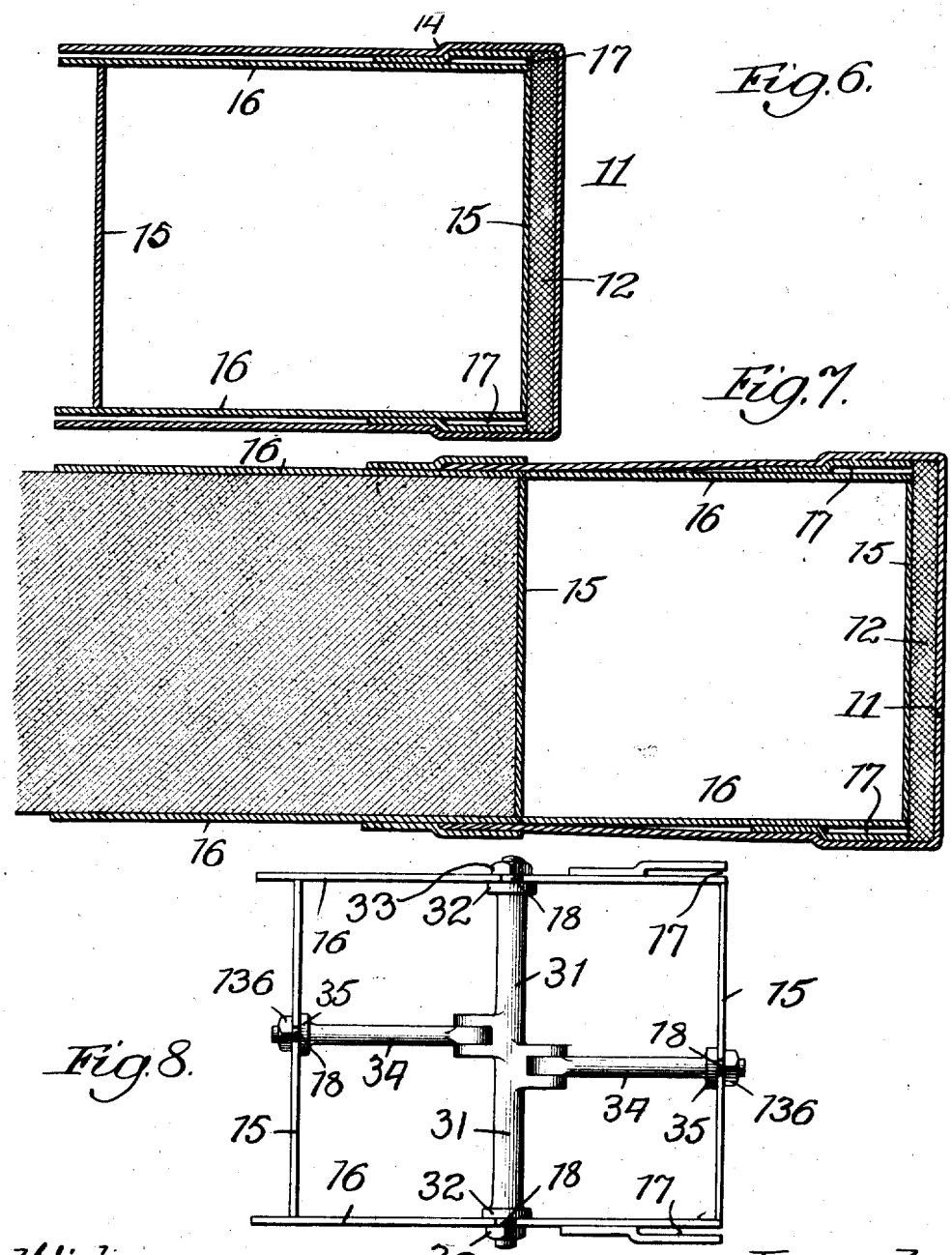

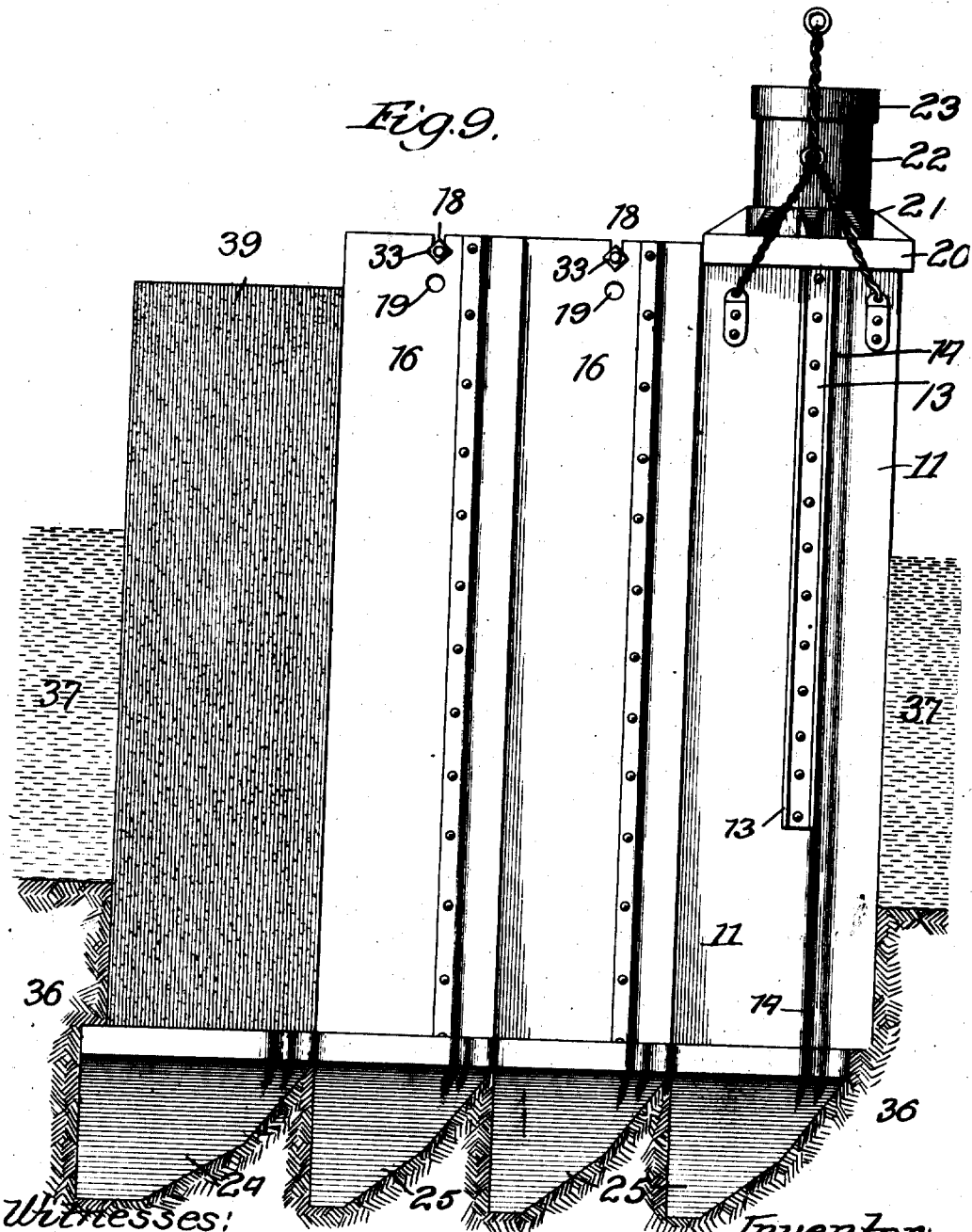

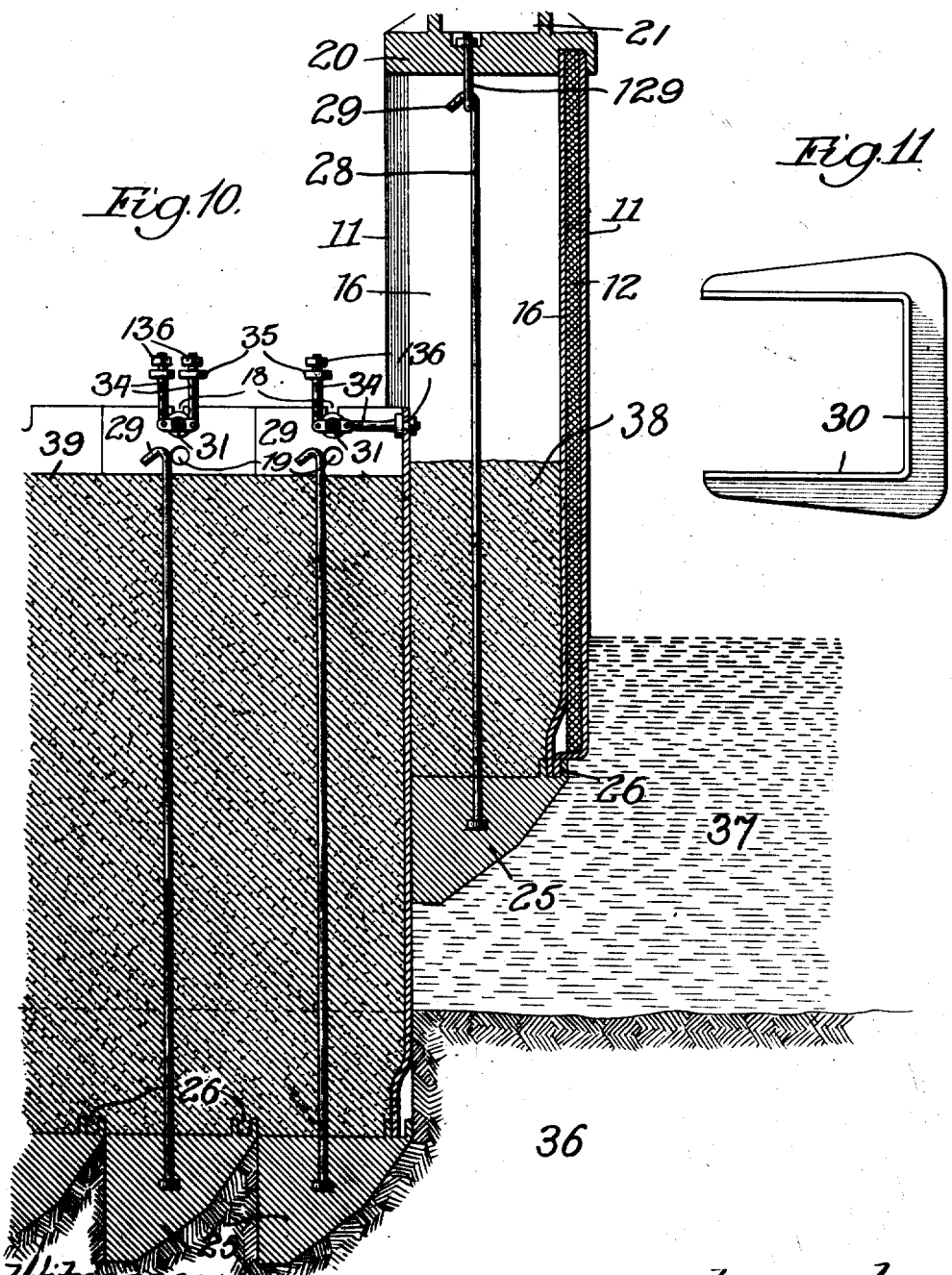

UNITED STATES PATENT OFFICE.

LINUS H. BRACE, OF EVANSTON, ILLINOIS, ASSIGNOR OF ONE-HALF TO W. H. FAHRNEY, OF CHICAGO, ILLINOIS.

DRIVEN MOLD FOR SUNKEN CONCRETE STRUCTURES.

No. 903,441.  Specification of Letters Patent.  Patented Nov. 10, 1908.

Application filed August 3, 1908. Serial No. 446,595.

*To all whom it may concern:*

Be it known that I, LINUS H. BRACE, a citizen of the United States, residing at Evanston, in the county of Cook and State of Illinois, have invented a new and useful Improvement in Driven Molds for Sunken Concrete Structures, of which the following is a specification.

The object of my invention is to provide a mold-construction which shall adapt it to be driven, in the manner of pile-driving, to receive concrete to be molded therein and form a pile, a pier, sea-wall or other section of a sunken or submerged structure, and to be withdrawn for repeated use in completing the structure.

Figure 1:
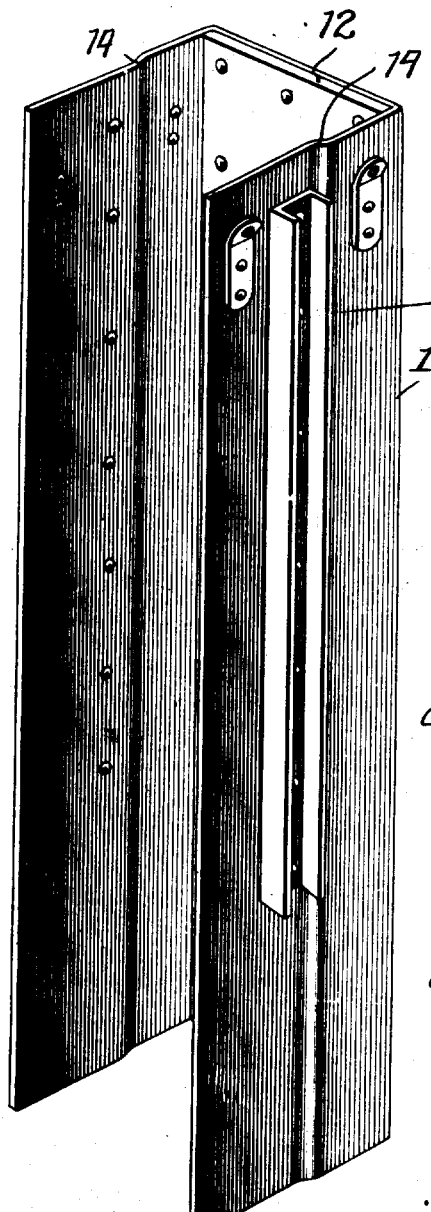
Figure 2:
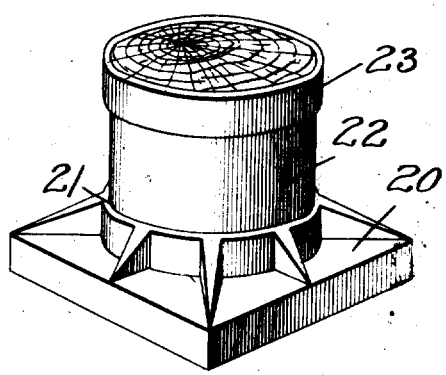
Figure 3:
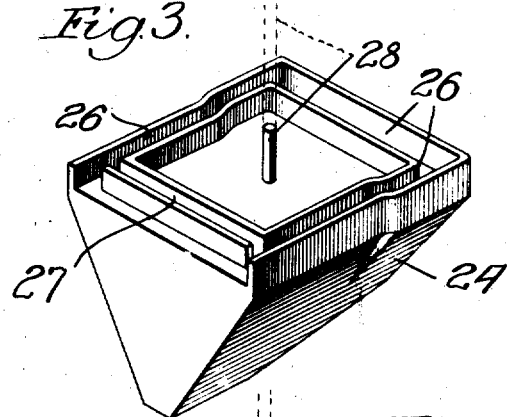
Figure 4:
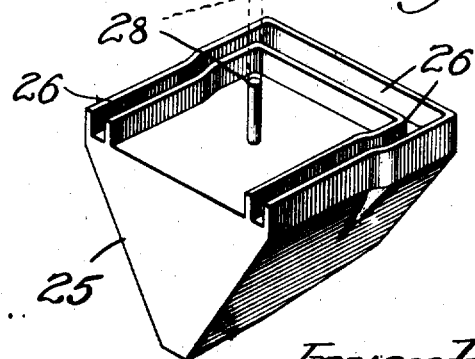

In the accompanying drawings, Figure 1 is a perspective view of a preferred form of the casing of my improved mold; Fig. 2 is a similar view of the driving cap for the mold, and Figs. 3 and 4 are perspective views of two slightly different forms of the driving-point used; Fig. 5 is a perspective view showing in unassembled relation the sectional metal sheeting used as lining for the mold-casing; Fig. 6 is a transverse section through the complete mold, and Fig. 7 is a similar view but in the nature of a diagram showing a molded section of concrete confined in the mold-lining with the mold placed adjacent to it for molding an adjoining section of a concrete wall; Fig. 8 is a plan view of the casing-lining showing the means for collapsibly bracing the separable sections forming it; Fig. 9 is a digrammatic view representing the progress of the work of constructing a sea-wall by means of my improvement; Fig. 10 is a view for the same purpose showing the mold-mechanism in vertical section, and Fig. 11 is a plan view of a yoke-detail.

It will suffice for the purposes of the following description to confine it to the employment of my invention for constructing a concrete sea-wall by driving the mold to desired depth into the bed of a body of water, filling it with concrete to form a section of the wall, and removing the mold-casing for use in forming the next section while leaving the lining to support the precedingly molded section until the concrete is set.

The mold consists of a lined casing 11, formed of plate-steel and shown of general rectangular shape in cross-section, open along one side, with a filling 12 of wood in its back and channel-shaped guides 13 on its sides adjacent to offsets 14 in the casing, for guiding the movement of the mold in a pile-driver (not shown). Similar plates 15, 15 fit, respectively, in the back of the casing and cover its open side, and similar plates 16, 16 fit against the opposite inner sides of the casing, being provided on their forward edges with longitudinal jaws 17. Each of these plates, which form the essentially sectional casing-lining, is provided with a notch 18 in its upper end and contains a hole 19 below the notch at which to engage it for handling it through the medium of a crane or derrick (not shown).

A cap 20 fits upon the upper end of the casing and has formed on it an annular seat 21 for the wooden head 22 reinforced about its upper end with a metal band 23 and adapted to receive the impact of the hammer of the pile-driver. The lower end of the casing is closed by a metal driving-point 24 (Fig. 3) in molding the first wall-section and by a driving-point 25 (Fig. 4) in molding each succeeding section. The point is preferably formed solid of the general shape illustrated, that shown in Fig. 3 having a groove 26 formed about three sides of its top for seating the casing and the front and side lining-sheets, and a transverse groove 27 for seating the back lining-sheet or cover 15; and the point 25 differs from the other in being devoid of a seating-groove 27 and is therefore that much shorter.

To assemble the parts of the mold for beginning operations on a selected site, the sheets 15 and 16 are adjusted in place in the casing and the point 24 and cap 20 are applied, a rod 28 rising from the point to engage a hook 29 on its upper end with a loop 129 depending centrally from the cap. The sheets 15 and 16 thus occupy the relative positions represented in Fig. 6.

With the parts thus assembled the mold is ready to be placed for driving it into the bed 36 of a body of water, indicated at 37, by the usual operation of a pile-driver acting against the head 22. When the mold has been thus driven to the desired depth the cap 20 is removed and the mold is filled to the required height with concrete 38 to form a wall-section 39, though the filling may be done while the mold is being lowered into place, as indicated in Fig. 10. Thereupon the casing 11 is withdrawn, leaving the point 24 permanently in the bed 36 and the rod 28 in the concrete, thereby rendering the rod a reinforcing medium, and also leaving the sheeting 15 and 16 to support the concrete section. In raising the casing to withdraw it, just before its lower end clears the upper ends of the lining-sheets, the latter must be braced against displacement by the outward pressure of the concrete filling. This may be done temporarily by encircling the sheets near their upper ends by a three-sided yoke 30 (Fig. 11) adapted to fit about the side-sheets 16 and back-sheet 15 (or that adjacent to the filling 12). When the casing is fully withdrawn from the lining sheets, they are braced by a bar 31 having collars 32 near its threaded ends, which find bearing in the notches 18 of the side-sheets and are fastened by nuts 33 clamping the sheets between them and the collars; and pivotal bracing-arms 34 extend from opposite sides of the bar 31 to introduce their threaded ends into the notches 18 of the sheets 15 which are clamped between collars 35 on the arms and nuts 136 applied to their threaded ends. The casing is then lined in the manner described with other side-sheets 16 and a back-sheet 15, omitting, however, a front-sheet 15, and a head 25 and the cap 22 are applied and connected by a rod 28; and the mold thus completed is driven into the bed close to a face of the previously molded concrete section. In driving the mold the edges of the open side of the casing enter and are guided (see Fig. 7) in the jaws 17 of the side-sheets 16 left embedded, as aforesaid, and the embedded back-sheet 15 at the first-molded wall-section 39 (Figs. 7 and 9) covers the open side of the casing (see Fig. 10) when thus driven after the first driving, thereby protecting the green concrete of the section 39 from damage in driving the mold so closely against it. The mold is filled with concrete to form the second wall-section, whereupon the casing is removed to be again equipped as last described and leaving the buried point 25 and its rod 28 and the protecting lining-sheets of the three sides of the casing. (See Fig. 9.) It will be observed that for each mold-equipment after the first a point 25 is used instead of a point 24, since the latter would encounter obstruction in driving it and it is not required to carry any sheet 15 for covering the open side of the casing and it must be as much shorter from front to back than the point 24 as the depth of entrance of the side-walls of the casing into the jaws 17.

While the concrete forming the first wall-section 39 is still green, the sheet 15 separating it from the next succeeding section is withdrawn, after releasing and turning up the arm 34 which clamps it, to permit the concrete of the two sections to fall together and thus unite and become bonded; and when the concrete forming a wall-section has set the supporting sheets 16 (and the front sheet 15 of the first-molded section) are withdrawn (Fig. 9) to be used over again for lining the casing, the brace-mechanism 31, 34 being removed to permit such withdrawal.

The operations thus described are repeated until the wall is completed, the progress of construction being illustrated in Figs. 9 and 11. If it be desired to construct the wall of double or greater thickness, sections may be molded in the manner described at the back or front sides of those forming the one thickness of the wall and bonded at their opposing surfaces by producing a union of the concrete in the described way.

While Fig. 9 shows, for the purpose of the description, the front wall-section bared of incasement while the two succeeding sections are still incased, it will be understood that a larger number of wall-sections than thus represented will be left with the reinforcing mold-lining embedded because many will be formed in a day while it requires several days for the concrete to set.

What I claim as new and desire to secure by Letters Patent is—

1. A concrete-mold adapted to be driven for the purpose set forth, comprising a casing provided with a sectional lining separably contained therein, a drive-point on one end of the casing and a cap on its opposite end provided with an impact-head.

2. A concrete-mold adapted to be driven for the purpose set forth, comprising a casing having an open side and provided with a sectional lining separably contained therein, a drive-point on one end of the casing and a cap on its opposite end provided with an impact-head.

3. A concrete-mold adapted to be driven for the purpose set forth, comprising a casing provided with a sectional lining, means for separably connecting the lining-sections in the casing, a drive-point on one end of the casing and a cap on its opposite end provided with an impact-head, said point and cap being separable from the casing.

4. A concrete-mold adapted to be driven for the purpose set forth, comprising a casing provided with a sectional lining, means for separably connecting the lining-sections in the casing, a drive-point on one end of the casing and a cap on its opposite end provided with an impact-head, and a rod separably connecting together said point, casing and cap.

5. A concrete-mold adapted to be driven for the purpose set forth, comprising a casing provided with a sectional lining separably contained therein, a drive-point provided with seats for the lining-sections and casing on one end of the latter, and a cap on the opposite end of the casing provided with an impact-head, and a rod extending from said point through the casing and engaging the cap to separably connect the point, casing and cap.

6. A concrete-mold adapted to be driven for the purpose set forth, comprising a casing having an open side, a sectional lining contained in the casing including side-sheets having edge-jaws to extend along said open side, a drive-point on one end of the casing and a cap on its opposite end provided with an impact-head.

7. A concrete-mold adapted to be driven for the purpose set forth, comprising a casing having an open side, metal sheets in said casing including side-sheets having edge-jaws to extend along said open side, said sheets containing notches in their upper ends, a clamping rod connecting said side-sheets at their notches and having pivotal clamping-arms extending from it to connect the other sheets at their notches, a drive-point on one end of the casing and a cap on its opposite end provided with an impact-head.

LINUS H. BRACE.

In presence of—
L. HEISLAR,
R. SCHAEFER.